US012676155B2

(12) United States Patent
Hilmarsson et al.

(10) Patent No.: US 12,676,155 B2
(45) Date of Patent: Jul. 7, 2026

(54) AI-ASSISTED TRANSCRIPT ANALYSIS AND SCRIPT GENERATION

(71) Applicant: Zoom Video Communications, Inc., San Jose, CA (US)

(72) Inventors: Helgi Hilmarsson, Corte Madera, CA (US); Andrew Sung Jae Kim, Cambridge, MA (US); Bilung Lee, San Jose, CA (US); Vijay Venkataswamy Parthasarathy, San Jose, CA (US); Sasank Vemuri, Pflugerville, TX (US)

(73) Assignee: Zoom Communications, Inc., San Jose, CA (US)

( * ) Notice: Subject to any disclaimer, the term of this patent is extended or adjusted under 35 U.S.C. 154(b) by 219 days.

(21) Appl. No.: 18/226,097

(22) Filed: Jul. 25, 2023

(65) Prior Publication Data

US 2024/0395259 A1     Nov. 28, 2024

Related U.S. Application Data

(60) Provisional application No. 63/468,684, filed on May 24, 2023.

(51) Int. Cl.
*G10L 17/02* (2013.01)
*G10L 17/22* (2013.01)

(52) U.S. Cl.
CPC .............. *G10L 17/22* (2013.01); *G10L 17/02* (2013.01)

(58) Field of Classification Search
CPC ............... H04L 12/1831; H04L 65/406; H04L 12/1822; G06F 16/24575; G06F 16/685; G06F 40/35; G10L 15/063; G10L 15/26; G10L 17/22; G10L 17/02
See application file for complete search history.

(56) References Cited

U.S. PATENT DOCUMENTS

| | | | |
|---|---|---|---|
| 10,210,861 B1 * | 2/2019 | Arel ........................ G06N 20/00 |
| 11,687,576 B1 * | 6/2023 | Katz .................. H04N 21/4882 |
| | | | 715/254 |
| 11,954,443 B1 * | 4/2024 | Kumar ................... G06N 3/044 |

(Continued)

OTHER PUBLICATIONS

EP International Search Report and Written Opinion for PCT/US2024/028490 mailed Sep. 9, 2024.

*Primary Examiner* — Jakieda R Jackson
(74) *Attorney, Agent, or Firm* — Kilpatrick Townsend & Stockton LLP

(57)     ABSTRACT

One example method includes receiving, by a virtual conference provider, audio streams from a plurality of participants during a virtual conference; performing speech recognition, by the virtual conference provider, on the received audio streams to generate a transcript of the virtual conference; determining one or more utterances made during the virtual conference; determining, using a first trained machine learning ("ML") model, one or more sub-topics discussed during the virtual conference based on the one or more utterances; determining, using a second trained machine learning ("ML") model, one or more topics discussed during the virtual conference based on the one or more sub-topics; determining metadata corresponding to each of the one or more topics, the one or more sub-topics, and the one or more utterances; and generating and providing suggested follow-up topics for a subsequent virtual conference based on the metadata.

20 Claims, 12 Drawing Sheets

(56) References Cited

U.S. PATENT DOCUMENTS

| | | | | |
|---|---|---|---|---|
| 12,079,821 | B2 * | 9/2024 | Ellison | G06N 20/00 |
| 12,192,022 | B1 * | 1/2025 | Carbune | H04M 3/569 |
| 2016/0099986 | A1 | 4/2016 | Bentley et al. | |
| 2018/0075139 | A1 * | 3/2018 | Sadovsky | G06N 20/20 |
| 2018/0137157 | A1 * | 5/2018 | Gausman | G06F 16/2272 |
| 2019/0205391 | A1 * | 7/2019 | Dobrynin | G06F 9/454 |
| 2020/0258525 | A1 | 8/2020 | McQuiston et al. | |
| 2020/0279567 | A1 * | 9/2020 | Adlersberg | G06F 40/35 |
| 2020/0380389 | A1 * | 12/2020 | Eldeeb | G06F 16/285 |
| 2022/0311634 | A1 | 9/2022 | Sengupta | |
| 2022/0328039 | A1 * | 10/2022 | Avijeet | G10L 15/063 |
| 2023/0007063 | A1 | 1/2023 | Gupta et al. | |
| 2023/0080660 | A1 * | 3/2023 | Miletic | G10L 15/063 |
| | | | | 382/103 |
| 2023/0134143 | A1 | 5/2023 | Chau | |
| 2023/0205797 | A1 * | 6/2023 | Das | G06F 16/90332 |
| | | | | 704/9 |
| 2023/0215439 | A1 * | 7/2023 | Kanda | G10L 17/04 |
| | | | | 704/235 |
| 2023/0260536 | A1 * | 8/2023 | Xu | G06V 40/20 |
| | | | | 704/231 |
| 2023/0298615 | A1 * | 9/2023 | Can | G10L 15/1815 |
| 2024/0095449 | A1 * | 3/2024 | Ranganathan | G06F 40/216 |
| 2024/0354713 | A1 * | 10/2024 | Sim | G06Q 10/107 |
| 2024/0386189 | A1 * | 11/2024 | Malladi | G06F 40/166 |
| 2024/0428937 | A1 * | 12/2024 | Natarajan | G16H 50/20 |
| 2025/0103620 | A1 * | 3/2025 | De Oliveira | G10L 15/26 |

* cited by examiner

SUB-TOPIC
ANALYSIS
364

UTTERANCE
IDENTIFICATION
366

GENERATED
SUB-TOPICS
412

IDENTIFIED
UTTERANCES
410

TRANSCRIPT
FEATURE
GRAPH
400

TOPIC ANALYSIS 362

SUB-TOPIC ANALYSIS 364

UTTERANCE IDENTIFICATION 366

GENERATED TOPICS 414

GENERATED SUB-TOPICS 412

IDENTIFIED UTTERANCES 410

TRANSCRIPT FEATURE GRAPH 400

TOPIC ANALYSIS 362

SUB-TOPIC ANALYSIS 364

UTTERANCE IDENTIFICATION 366

RANKING/ FILTERING 368

TRANSCRIPT FEATURE GRAPH 400

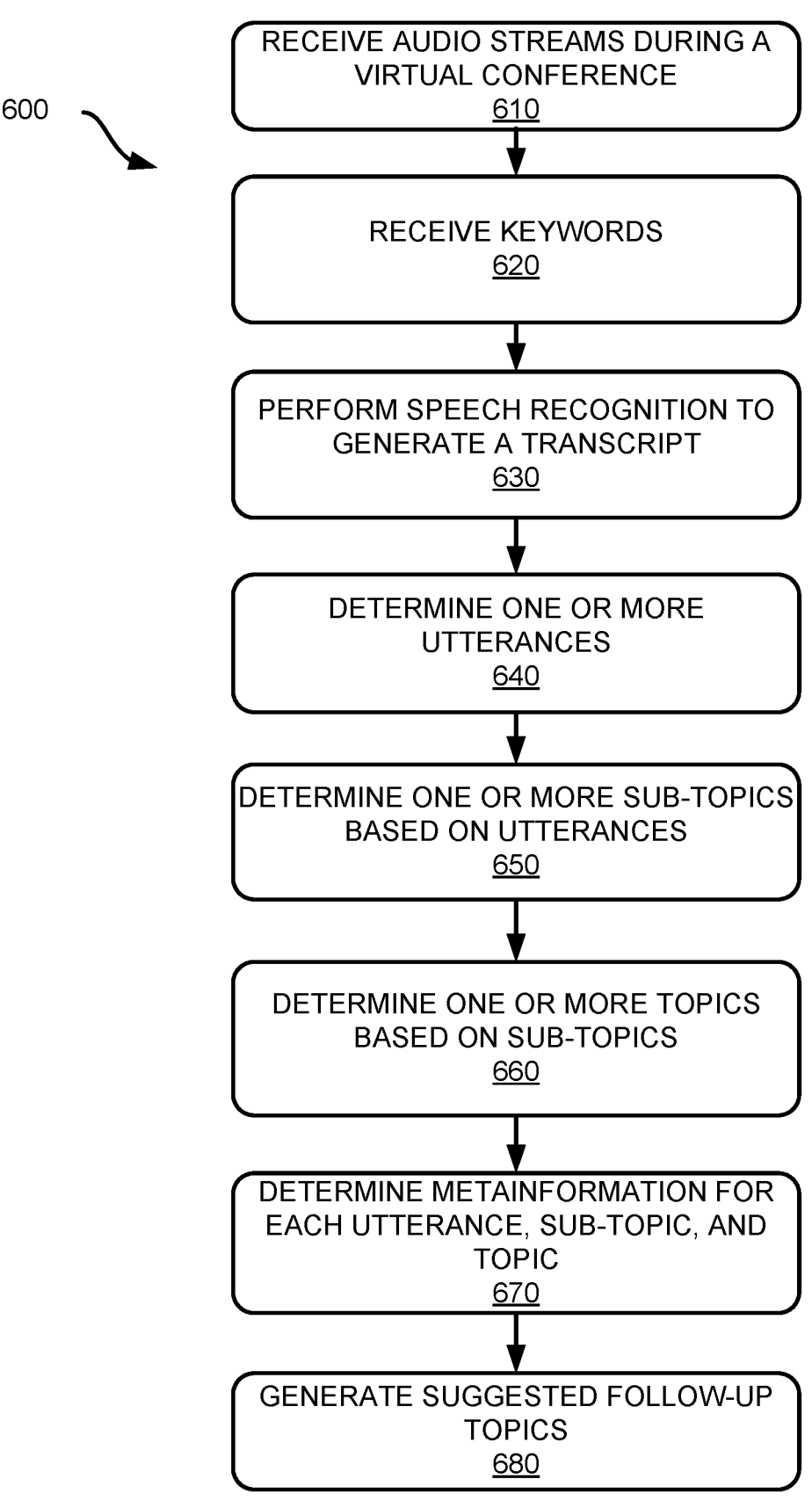

600

RECEIVE AUDIO STREAMS DURING A
VIRTUAL CONFERENCE
610

RECEIVE KEYWORDS
620

PERFORM SPEECH RECOGNITION TO
GENERATE A TRANSCRIPT
630

DETERMINE ONE OR MORE
UTTERANCES
640

DETERMINE ONE OR MORE SUB-TOPICS
BASED ON UTTERANCES
650

DETERMINE ONE OR MORE TOPICS
BASED ON SUB-TOPICS
660

DETERMINE METAINFORMATION FOR
EACH UTTERANCE, SUB-TOPIC, AND
TOPIC
670

GENERATE SUGGESTED FOLLOW-UP
TOPICS
680

*FIG. 6*

AI-ASSISTED TRANSCRIPT ANALYSIS AND SCRIPT GENERATION

FIELD

The present application generally relates to virtual conferences and more particularly relates to artificial intelligence ("AI")-assisted transcript analysis and script generation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example system for AI-assisted transcript analysis and script generation.

DETAILED DESCRIPTION

Figure 1:
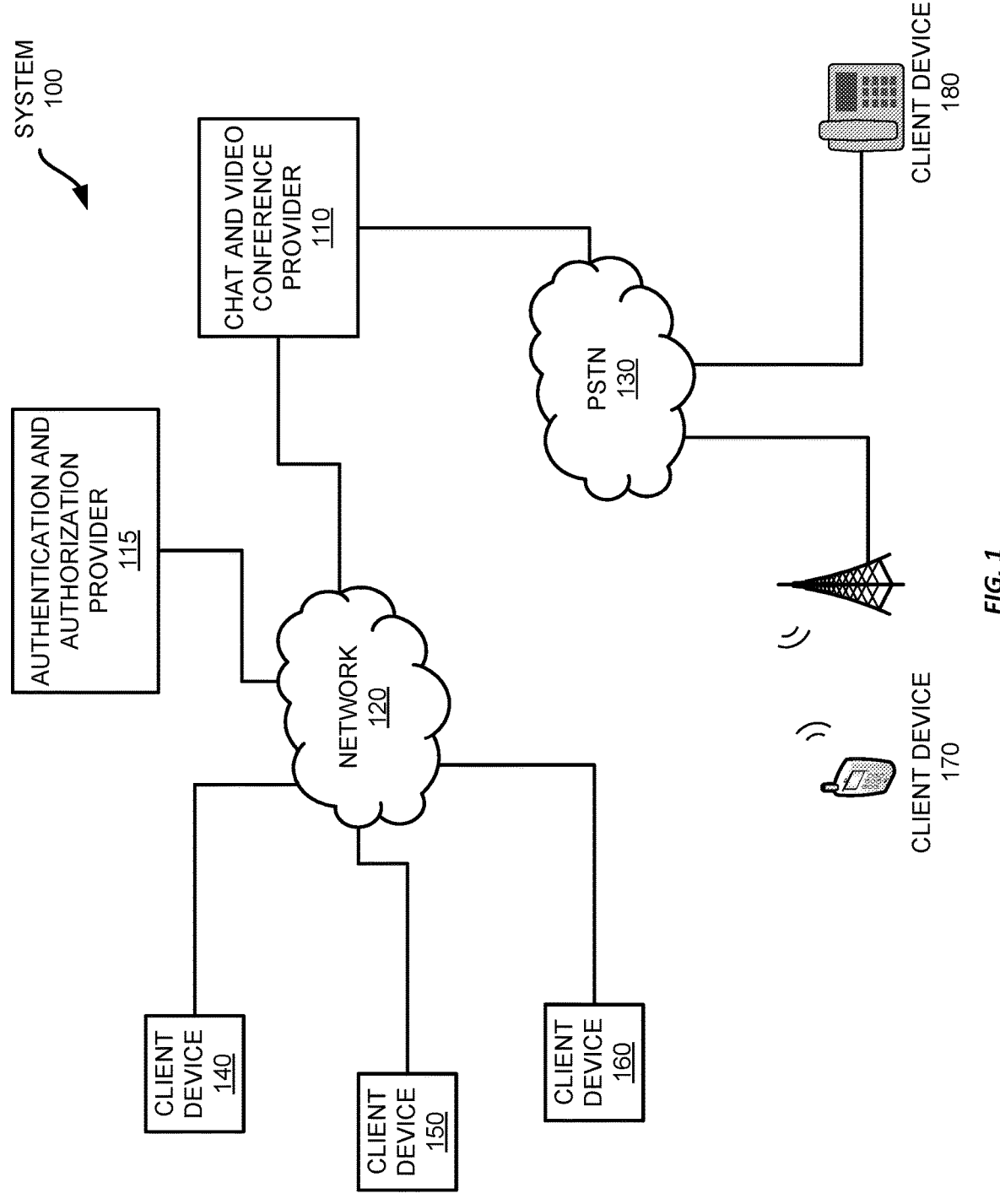
FIGS. 1 and 2 show example systems for AI-assisted transcript analysis and script generation.

Examples are described herein in the context of AI-assisted transcript analysis and script generation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In modern life, people frequently interact using electronic devices, such as by chat messaging, one-on-one phone calls, or virtual conferences, such as video or telephone conferences. In many cases, such communication channels may be hosted by a virtual conference provider, even in the case of one-on-one phone calls or chat messages. Virtual conference providers may provide enhancements of some of these channels by providing transcripts of a conversation or a conference, either in real-time or after the conclusion of the conference. Real-time transcripts can assist participants who may have difficulty hearing or who do not speak the language(s) used by other participants in the conference. Transcripts can also be used after a conference to review the details of the discussion, which may provide action items or important information to guide work on a project. In some cases, participants may use transcripts of past conferences to prepare for an upcoming conference, such as to recall information discussed during the meeting.

To assist with analyzing a transcript of a conference to prepare for subsequent conference, the virtual conference provider performs automatic speech recognition ("ASR") on audio streams received during a virtual conference. The recognized speech is then saved to a transcript, which may then be provided to one or more AI models to analyze the transcript. First, the system identifies utterances within the transcript, such as based on one or more keywords provided by the host of the virtual conference. However, one or more AI models may be used for semantic or grammatical analysis to identify utterances. Once the utterances have been identified, one or more sub-topics are identified based on the utterances. For example, sub-topics corresponding to keywords may be generated from the identified utterances. Next, the virtual conference provider generates key-phrases, such as by identifying one or more n-grams within the sub-topics, to generate topics for the transcript.

After identifying the topics, sub-topics, and utterances, the virtual conference provider can then filter topics that were not the focus of discussion and can use an AI model to analyze contextual information, such as a level of engagement, sentiment, or level of interest for a sub-topic or topic. The contextual information may then be associated with topics, sub-topics, or individual utterances as metadata. Thus, the AI model(s) used by the virtual conference provider can create a systematic analysis of the conversation held during the conference, including identifying contextual information associated with the topics discussed.

After identifying the topics, sub-topics, and utterances, and after generating the metadata based on the determined contextual information, the virtual conference provider can submit the transcript and the corresponding topics, sub-topics, utterances, and metadata to a large-language model ("LLM") to generate a proposed script or agenda for a subsequent conference between the participants. For example, following the call with the customer, the salesperson can use the virtual conference provider to generate a script or set of talking points for the next call with the customer. The virtual conference provider can use the LLM to identify areas of interest for the customer, such as a particular makes or models of car and particular options packages the customer seemed interested in. In addition, the LLM can identify topics for the salesperson to avoid, such as areas where the customer expressed little or no interest. Finally, the LLM can identify areas that the salesperson may want to address where the customer expressed skepticism or concerns. Thus, but performing the AI analysis discussed above and using the derived information as input information for a LLM, a high-quality generated script or agenda can be generated and used to guide a subsequent conference.

This illustrative example is given to introduce the reader to the general subject matter discussed herein and the disclosure is not limited to this example. The following sections describe various additional non-limiting examples and examples of AI-assisted transcript analysis and script generation.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
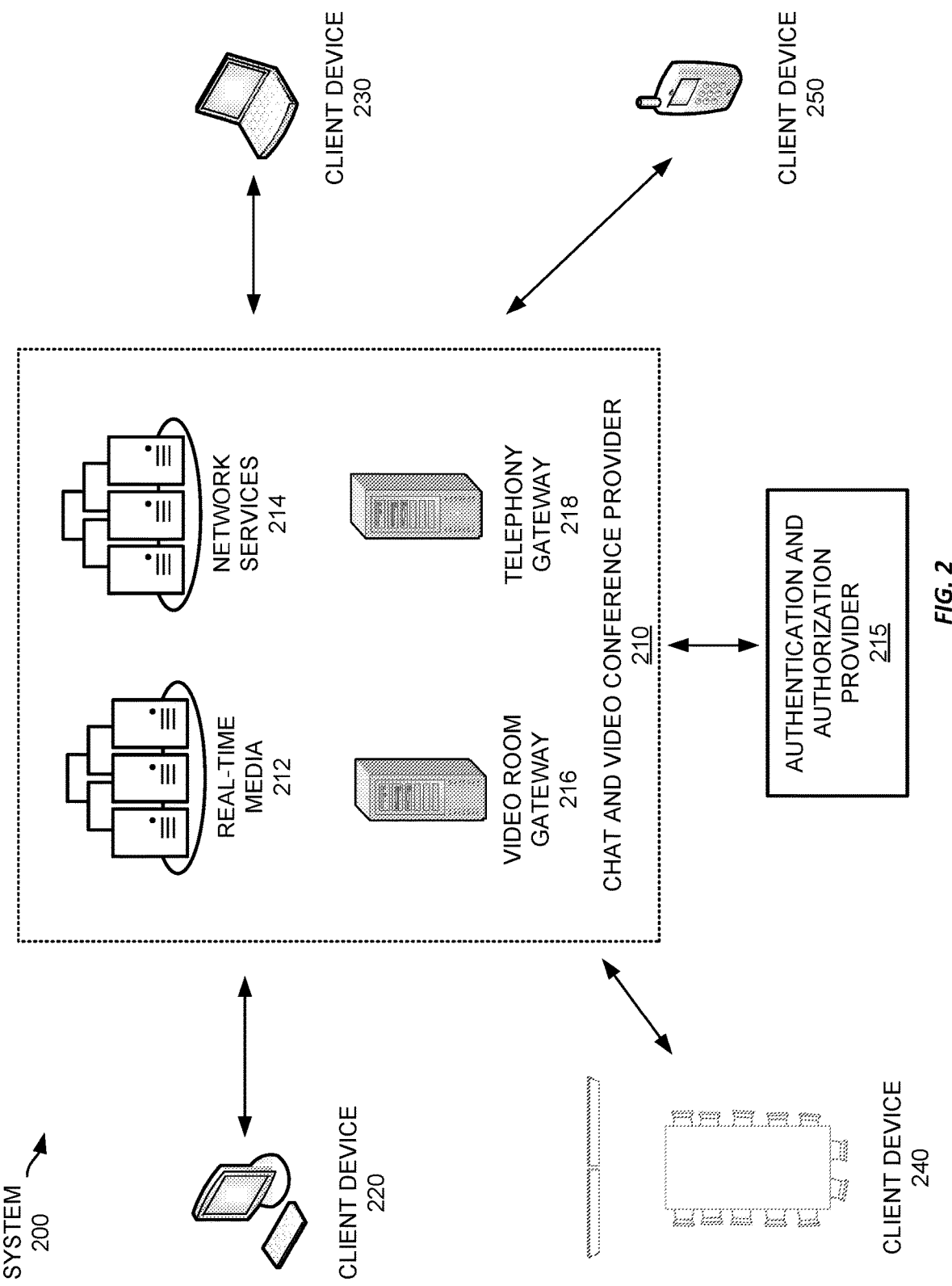

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/( ) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting.

Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
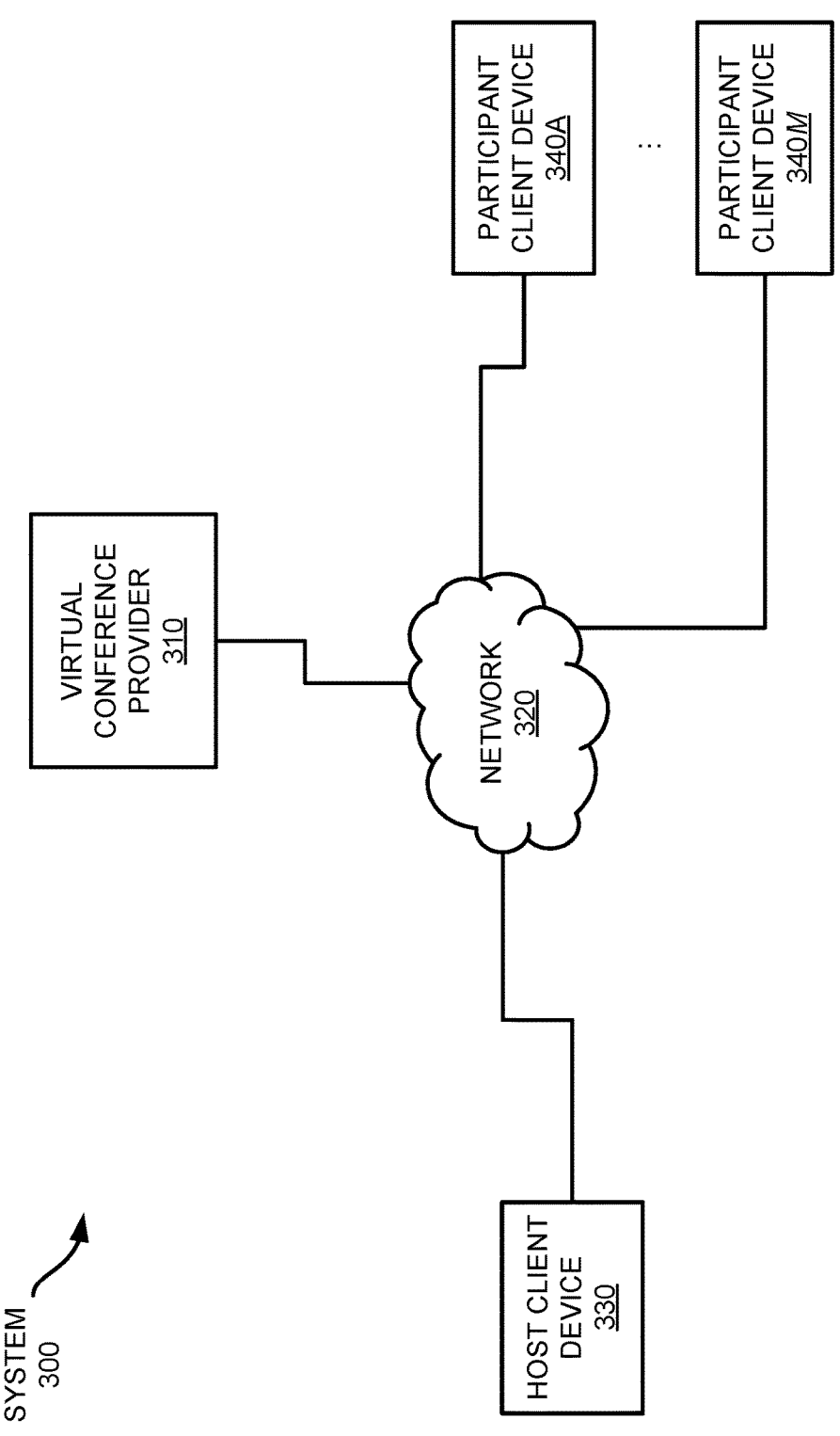
FIGS. 3A-3B show an example system for AI-assisted transcript analysis and script generation.
Figure 3B:
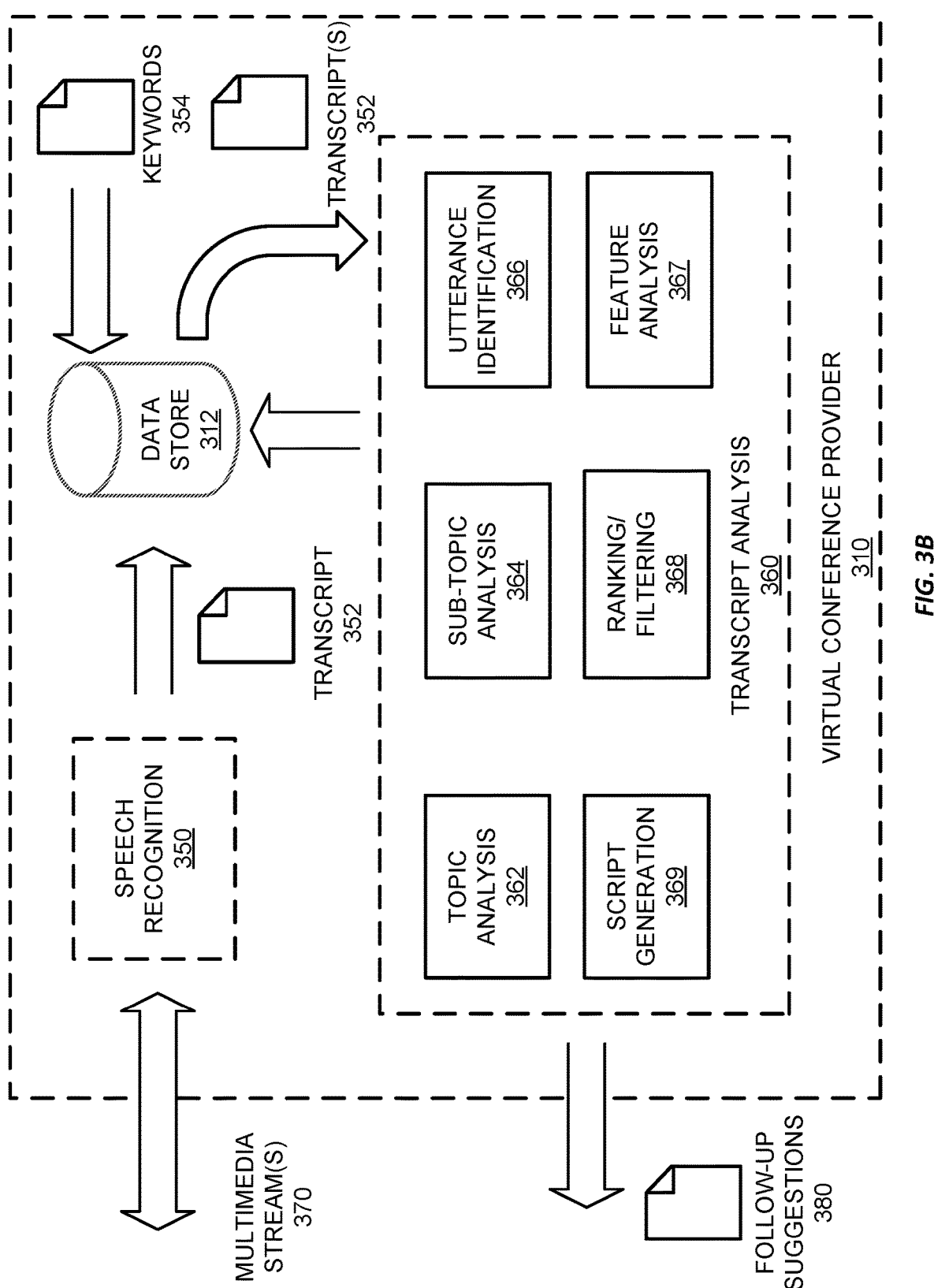

Referring now to FIGS. 3A-3B, FIG. 3A shows an example system 300 for AI-assisted transcript analysis and script generation. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software that connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves.

The user of the host client device 330 may initiate a virtual conference with other users at other client device 340a-m to discuss any matters of interest, which are recorded in a transcript over the course of the call, which may include the participants agreeing to having the call transcribed. For example, a salesperson may conduct virtual meetings with potential customers to discuss products or services of interest, pricing information, and other relevant information to the sale. During the call, the parties discussion may cover many different questions or options, different products, or many different services, but may not conclude the sales process. Thus, in a follow-up call, the salesperson may want to identify good topics to address to help complete the sale.

To obtain assistance with identifying follow-up strategies, the host can request that the virtual conference provider 310 analyze the transcript and identify topics discussed as well as other metainformation, such as a level of engagement or one or more of the participant's sentiments towards the topics. The metainformation can be stored as metadata associated with the transcript and used by the virtual conference provider to generate suggested topics for follow-up based on the topics discussed and associated metadata. The suggestions may indicate topics with high levels of engagement or positive sentiment to help focus on areas of particular interest to the customer or on topics where there is likely opportunity for a sale. In some cases, the suggestion may indicate topics where there was a negative sentiment as places to help identify more positive aspects related to the topic. The suggested topics can be arranged into an agenda or a script outline for a follow-up meeting.

Such a process may be similarly used for other scenarios beyond the sales context. For example, discussions during an engineering design meeting may be analyzed to identify areas where doubt exists about identified functionality or where there may be a lack of interest. These may help guide changes to the design process for subsequent meetings. Still other use cases are contemplated within the scope of this disclosure.

Referring now to FIG. 3B, FIG. 3B shows the virtual conference provider 310 from FIG. 3A, which is configured to provide AI-assisted transcript analysis and script generation. The virtual conference provider 310 includes a data store 312, speech recognition functionality 350, and transcript analysis system 360 that includes script generation functionality 369. In general, the virtual conference provider 310 receives multimedia streams 370 during a virtual conference from the participants, which it also transmits to the participants in the virtual conference to enable them to interact with each other. If the participants agree, the virtual conference provider 310 can also generate a transcript 352 of the virtual conference by providing incoming audio streams to speech recognition 350. After the virtual conference concludes, the transcript is completed and stored in the data store 312, where it is associated with the completed virtual conference.

At a later time, one or more transcripts 352 may be provided to the transcript analysis 360, which analyzes the transcripts to identify topics discussed during the associated virtual conferences and additional metainformation associated with the transcripts 352. In this example, the virtual conference provider's transcript analysis functionality 360 includes utterance identification 366, sub-topic analysis 364, topic analysis 362, feature analysis 367, ranking and filtering functionality 368, and script generation functionality 369. While the following description is of the analysis of a single transcript, it should be appreciated that analysis may be performed on multiple transcripts concurrently, such as based on transcripts of multiple virtual conferences between the participants. By using multiple transcripts, the available data for the transcript analysis functionality 360 may be increased, leading to higher-quality follow-up suggestions 380.

To start transcript analysis, a user may access the virtual conference provider 310, such as via a virtual conferencing client application, identify a virtual conference of interest, and select an option to generate follow-up suggestions based on the transcript of the virtual conference. The user may also identify one or more keywords 354, such as by entering the keywords into the virtual conferencing application or identifying keywords from one or more sets of keywords available within the datastore 312 to use in the transcript analysis. In some cases, the virtual conference provider 310 may automatically analyze a transcript based on one or more configuration options selected by the user. It should be appreciated that a keyword may be multiple words, such as the name of a person or company, a noun or verb phrase, or other grouping of multiple words, though single-word keywords may be used as well.

After receiving a transcript, the transcript analysis system 360 determines one or more utterances within the transcript using the utterance identification functionality 366. In this example, the utterance identification functionality 366 identifies sentences or phrases spoken by one or more of the participants that include one or more of the identified keywords 354. Utterances can be full sentences or parts of sentences, such as clauses or phrases that may occur during ordinary conversation. For example, a user may express a single thought in a sentence that includes an identified keyword, and thus the sentence may then be identified as a single utterance. However, in cases where the user states a sentence with multiple thoughts or that includes multiple keywords, the utterance identification functionality 366 may identify multiple utterances. For example, it may use a trained ML model to perform semantic or grammatical analysis (or both). For example, an utterance, "I liked the car, but I'm not a fan of red or white ones" may include two utterances: "I liked the car" and "but I'm not a fan of red or white ones," because two distinct thoughts are present. However, some examples may treat the sentence as a single utterance. Further, if keywords include "car" and car colors, like "red" and "white," the utterance identification system may identify two utterances, one related to the car and one related to the identified colors, or three utterances, one each for the car, the color red, and the color white. The utterance identification functionality 366 may also generate metadata corresponding to the identified utterances to identify the participant that provided the utterance, e.g., spoke or typed the utterance. Still further techniques may be employed to identify utterances within the transcript.

Figure 4A:
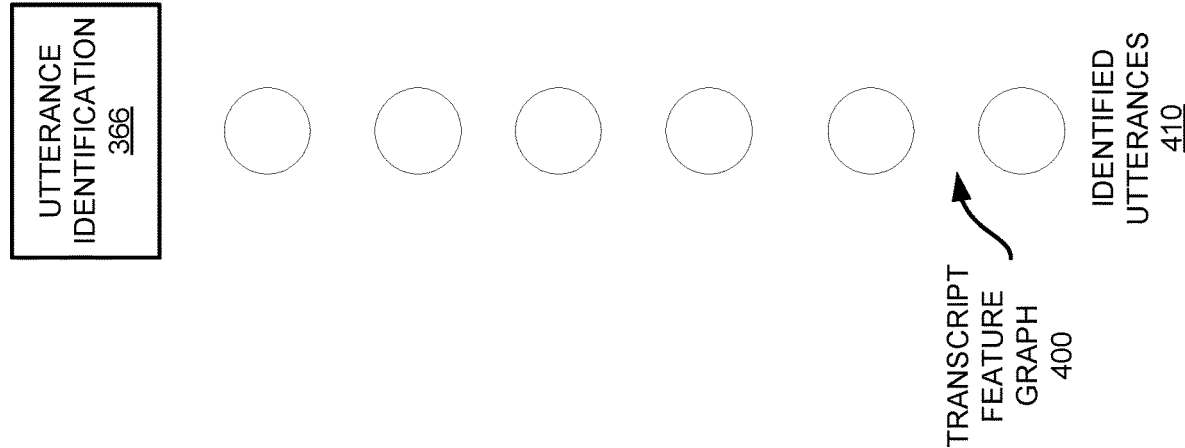
FIGS. 4A-4E show representations of a transcript feature graph generated by an example system for AI-assisted transcript analysis and script generation.

Referring to FIG. 4A, FIG. 4A shows a visual depiction of utterances identified by the utterance identification functionality 366. Each identified utterance is represented by a corresponding node 410 in the transcript feature graph 400 or graph 400. As additional analysis of the transcript occurs, the graph will expand and edges will be added. And while in this case, only six utterances 419 are depicted, any number of utterances may be identified in a transcript.

After the utterances within the transcript have been identified, the transcript analysis system 360 provides the utterances to the sub-topic analysis system 364, which identifies sub-topics discussed within the virtual conference. Using the example utterance above, the sub-topic analysis system 364 may perform semantic analysis of the identified utterances, e.g., "I liked the car, but I'm not a fan of red or white ones," to identify semantic meaning related to "discussing a color of a car." The sub-topic analysis system can generate a new sub-topic, if a related sub-topic has not already been generated, and associate the utterance with the sub-topic, or an existing sub-topic can be associated with the utterance. For example, if the salesperson had response to the customer by saying "Understood, but how do you feel about grey or silver?," the sub-topic analysis system may again perform semantic analysis of the utterance, and after generating the sub-topic "discussing a color of a car," it identifies that such a sub-topic has already been identified and associates the second utterance with the sub-topic. The sub-topic analysis functionality 364 can thus perform semantic analysis over the identified utterances within the transcript to generate a set of sub-topics discussed during the virtual conference. The sub-topic analysis functionality 364 may also generate metadata indicating how strongly related an utterance is to a sub-topic, which may be used to propagate features from the utterance to the sub-topic, as will be discussed in more detail below. The sub-topics may then be provided to the topic analysis system 362, which employs a trained machine-learning ("ML") model generates key-phrases, such as by identifying one or more n-grams within the sub-topics, to generate topics for the transcript. In examples employing n-gram extraction, any suitable n-gram extraction technique may be employed. Each key-phrase may then be established as a topic.

Figure 4B:
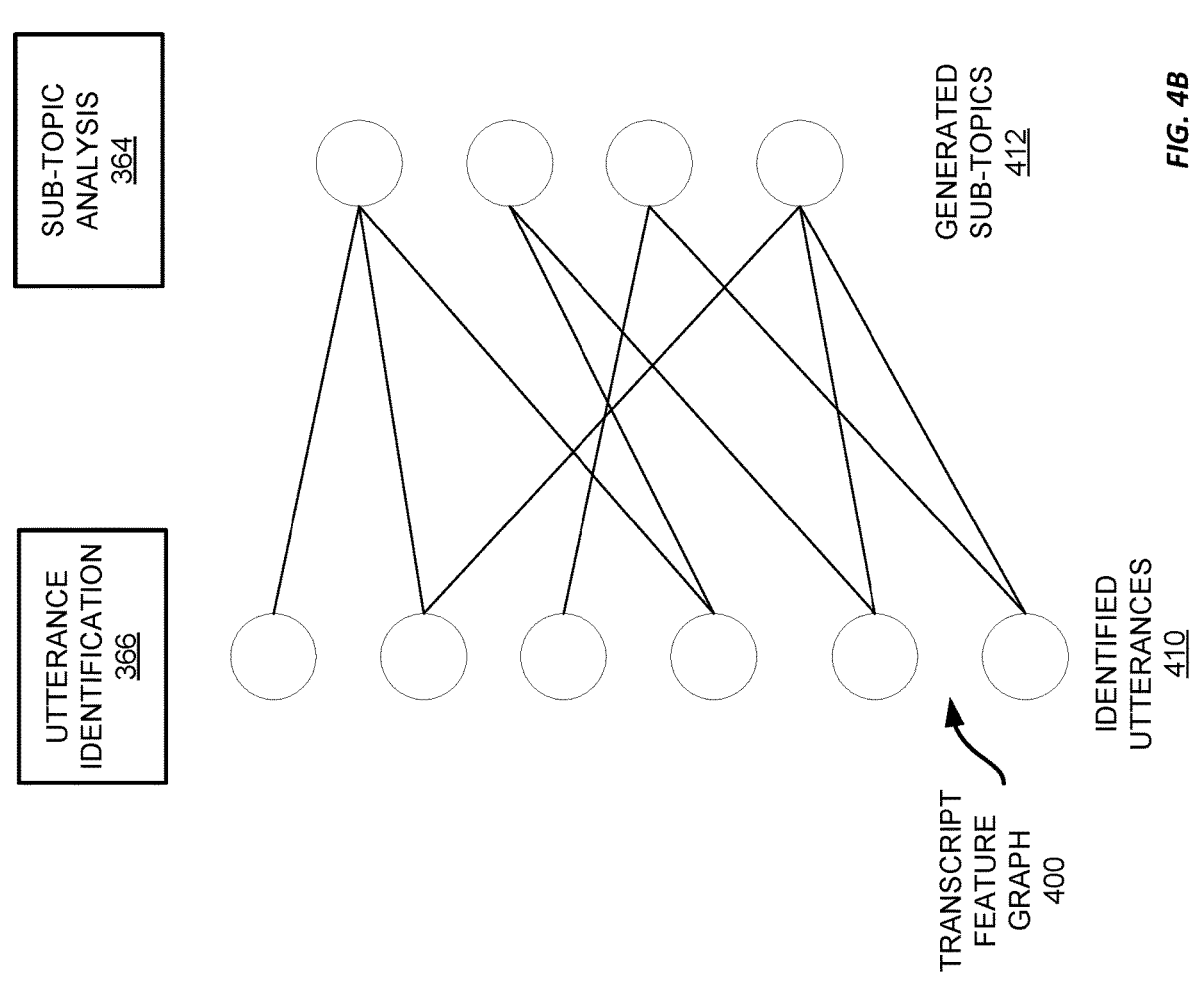
Figure 4C:
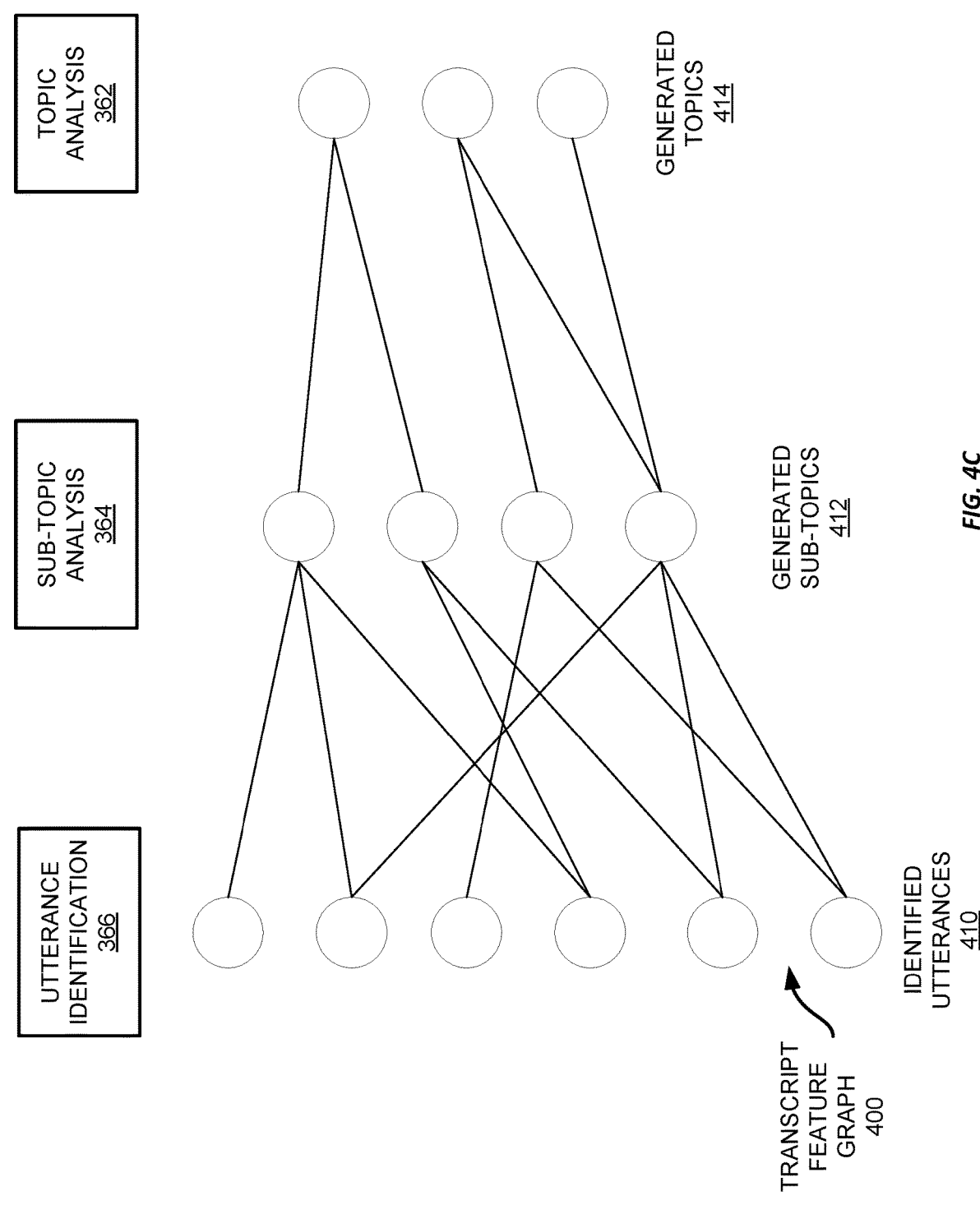

Referring now to FIGS. 4B-4C, FIG. 4B illustrates the transcript feature graph 400 following sub-topic generation, while FIG. 4C illustrates the transcript feature graph 400 following topic generation. As is shown in FIG. 4B, and was described above, sub-topics may be generated based on the identified utterances and then associated with the corresponding utterances. Relations between generated sub-topics and corresponding identified utterances 410 are illustrated as edges between the sub-topic nodes 412 and the utterance nodes 410. Similarly, as shown in FIG. 4C, topics may be generated based on key-phrases, such as n-grams, extracted from the subtopics. Thus, the topics may be related to one or more subtopics as illustrated by the edges connecting sub-topic nodes 412 to topic nodes 414.

Referring again to FIG. 3B, after identifying the utterances and generating the sub-topics and topics, the transcript analysis system 360 performs feature analysis 367 to identify metainformation for the utterances, sub-topics, and topics. In this example, feature analysis 367 determines sentiments associated with utterances, sub-topics, and topics. Sentiments relate to the speaker's attitude, such as positive, negative, or neutral. In this example, feature analysis is performed by a trained ML model on the utterances from the different participants in the meeting. The sentiments may the be propagated to the topics and sub-topics, such as by averaging the sentiments from all utterances related to a sub-topic, or all sub-topics related to a topic. And while averaging is one technique to propagate sentiments or other metainformation, such as a level of engagement or an energy level, other techniques may be used.

For example, weighted averaging may be used based on a length of an utterance, a confidence level of the sentiment analysis, or a strength of a relationship between the utterance and the sub-topic. For example, the feature analysis 367 may output a real number between 0 and 1 to indicate a sentiment, such as with 0 being a maximum negative sentiment and a 1 being a maximum positive sentiment. The feature analysis 367 may also output a confidence score as a real number between 0 and 1, indicating a confidence score between 0% and 100%. Thus, the confidence and the sentiment may be convolved, such as by multiplying them, to generate a weighted sentiment score. Thus, sentiments with a higher confidence score may have a greater impact than those with a lower confidence score. Sentiment scores for sub-topics may be propagated to topics by averaging as well, or by a weighted averaging scheme, such as based on a number of utterances associated with each sub-topic: (# of utterances$_1$*sub-topic sentiment$_1$)+ . . . + (# of utterances$_n$*sub-topic sentiment$_n$)/n. Still other propagation techniques may be employed, such as based on a strength of an association between a topic and sub-topic. The topic analysis functionality 362 may determine how strongly related a particular sub-topic is to a topic, similar to a confidence score, and weight the sentiment for each sub-topic based on the strength of the association between the sub-topic and topic. For example, a sub-topic may be associated with multiple topics, but with different levels of relevance. Thus, a sentiment or other metainformation associated with the sub-topic may contribute a different amount to each related topic.

Figure 4D:
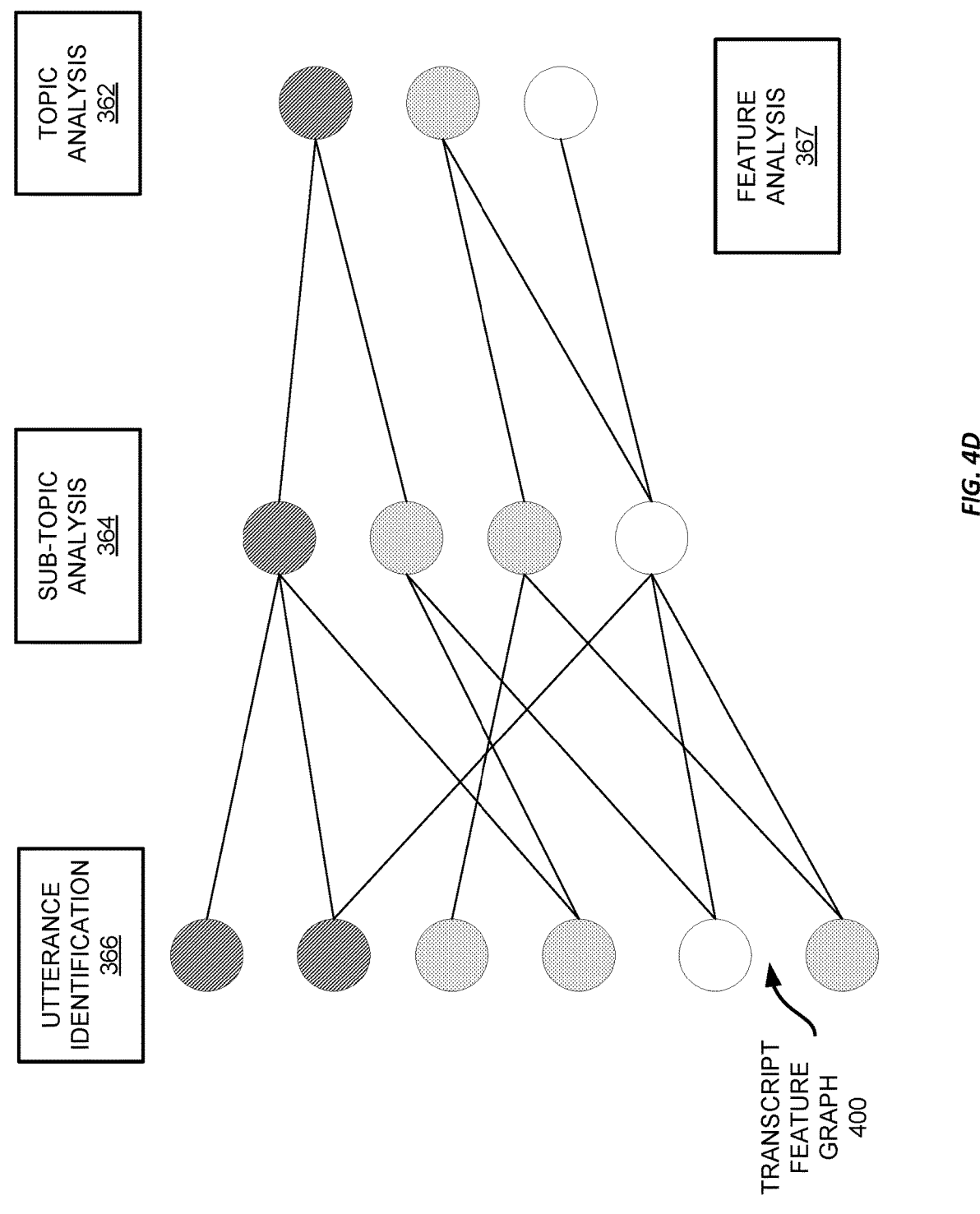

Referring now to FIG. 4D, FIG. 4D shows the transcript feature graph 400 after feature analysis 367 has been performed. In this example, the feature analysis has analyzed sentiment metainformation associated with the identified utterances from the transcript, which are represented by the shading depicted in FIG. 4D, with dark shading indicating negative sentiment, no shading indicating positive sentiment, and intermediate shading indicating neutral sentiment. And while the example shown in FIG. 4D has three different sentiments, it should be appreciated that sentiment information may span a continuous or discrete spectrum from negative to positive, such as may be represented by a real number from 0 to 1 or a range of integers from −10 to 10.

In some examples, only utterances from a particular speaker may be analyzed, such as utterances from a customer rather than the salesperson. Thus, the system could analyze the customer's sentiment towards the various sub-topics and topics discussed during the virtual conference without diluting the sentiment analysis with the salesperson's own sentiments. Alternatively, the salesperson may wish to review their own performance during the call to determine whether they were unintentionally disengaging from the conversation at any point or unintentionally deemphasizing certain products or features.

In addition to feature analysis, ranking and filtering 368 may be used to reduce a number of topics or n-grams generated from the sub-topics. For example, an initial n-gram analysis of sub-topics generated from identified utterances may generate a large number of potential topics. However, it may be desirable to limit a number of determined topics. In this example, the ranking and filtering functionality 368 begins by computing a semantic similarity between generated topics and utterances related to the topics. In this example, the semantic similarity is represented by a weight on an edge between a node in a graph representing the utterance and a node in the graph representing the generated topic. Thus, for each utterance/topic pair, a corresponding weight is determined.

The ranking and filtering functionality 368 then filters all edges having a weight that does not satisfy a predetermined threshold. After the edges have been filtered, the remaining edges for each topic are summed to generate a score. Then the topics are filtered based on the total number of remaining edges for each topic and the generated scores. Topics having a number of edges that does not satisfy a predetermined threshold are filtered. Similarly, topics having a generated score that does not satisfy another predetermined threshold are filtered. The remaining topics are then established as the topics for the transcript. It should be noted that ranking and filtering 368 can be performed before or after the feature analysis 367 is performed.

Figure 4E:
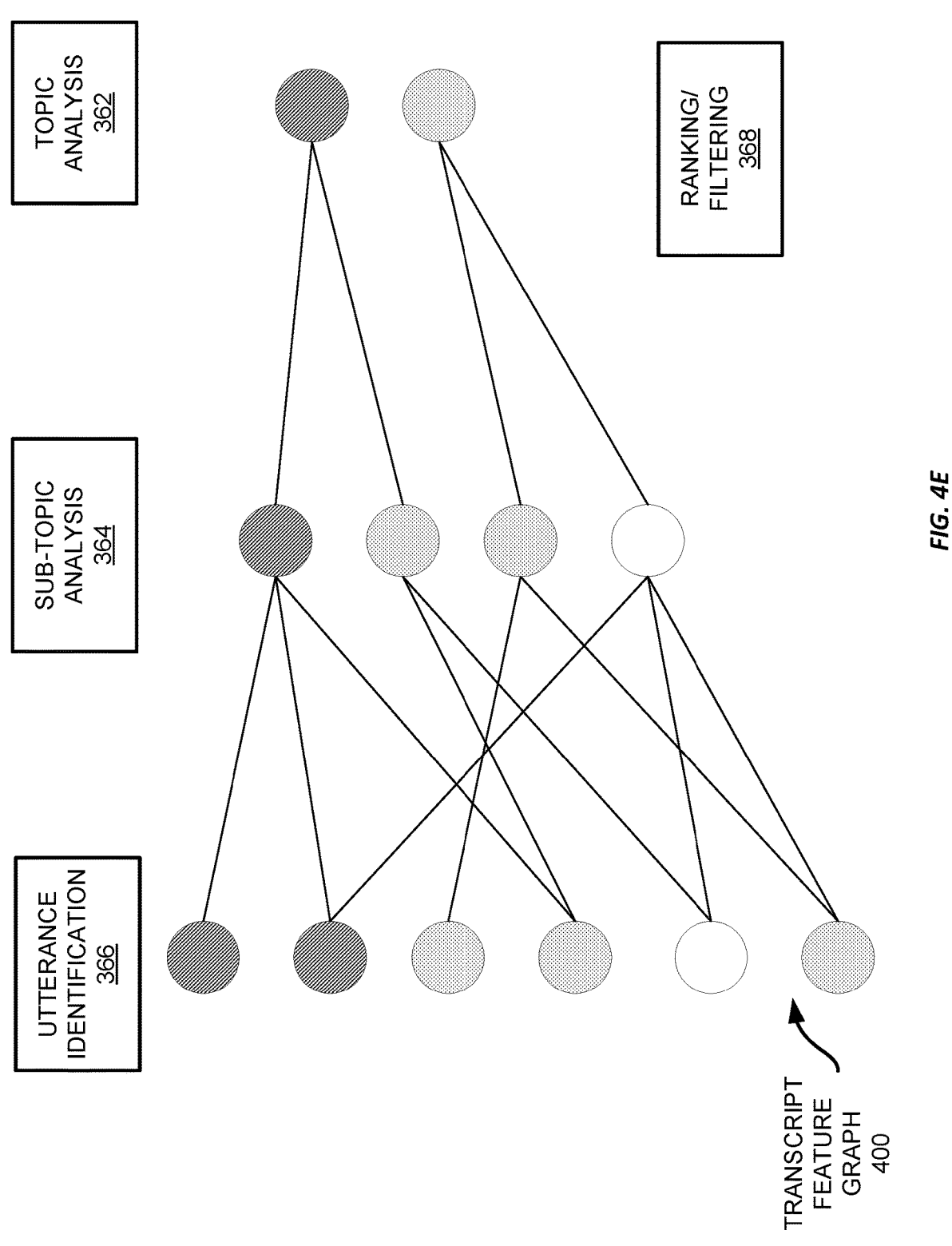

Referring now to FIG. 4E, FIG. 4E illustrates the transcript feature graph 400 after ranking and filtering 368 is performed. In this example, the ranking and filtering 368 has eliminated one of the generated topics 414 from the graph, as well as the corresponding edge(s). And while only one topic was filtered in this example, ranking and filtering may eliminate any number of topics. If all topics are filtered, the transcript analysis software 360 may adjust a filtering threshold to allow at least a predetermined number of topics to pass the filter.

Once the topics and metainformation have been established, the utterances, sub-topics, topics, and metainformation can be stored in the data stored 312 and associated with the transcript or the virtual conference. The metainformation may be stored as metadata corresponding to the respective utterances, sub-topics, and topics to maintain the determined metainformation for each, which was described above. The metadata may also be used to generate a visualization of the transcript by showing the utterances, sub-topics, and topics as well as the corresponding metainformation, such as by displaying a graph 400 showing the relationships between them, which may be manipulated by the user, such as to select specific metainformation to view or to sort the utterances, sub-topics, or topics according to any parameter of interest.

In addition, the transcript analysis system 360 may also employ script generation 369 to generate information for the user for a subsequent virtual meeting with the participants. In this example, the script generation functionality 369 may employ a LLM to generate a script based on the identified topics, sub-topics, or utterances as well as associated metadata. For example, the script generation functionality 369 may receive as input the established topics, the respective utterances, and the corresponding metadata to generate one or more follow-up suggestions 380. The follow-up suggestions 380 may be in the form of a full script to follow for a subsequent virtual meeting. In some examples, the follow-up suggestions 380 may be an agenda for the meeting or bullet points for the host to address during the meeting. The follow-up suggestions may include information indicating the other participants sentiments or level of engagement towards aspects of the script or the agenda in addition to textual information included within the follow-up suggestions. Thus, the user is provided both with a suggested approach to the next virtual meeting, but also information about how the other participants reacted to one or more of the topics within the suggested approach. The follow-up suggestions may also be stored in the data store 312 and associated with the virtual meeting, the transcript 352, or an upcoming virtual meeting with the participants.

Figure 5:
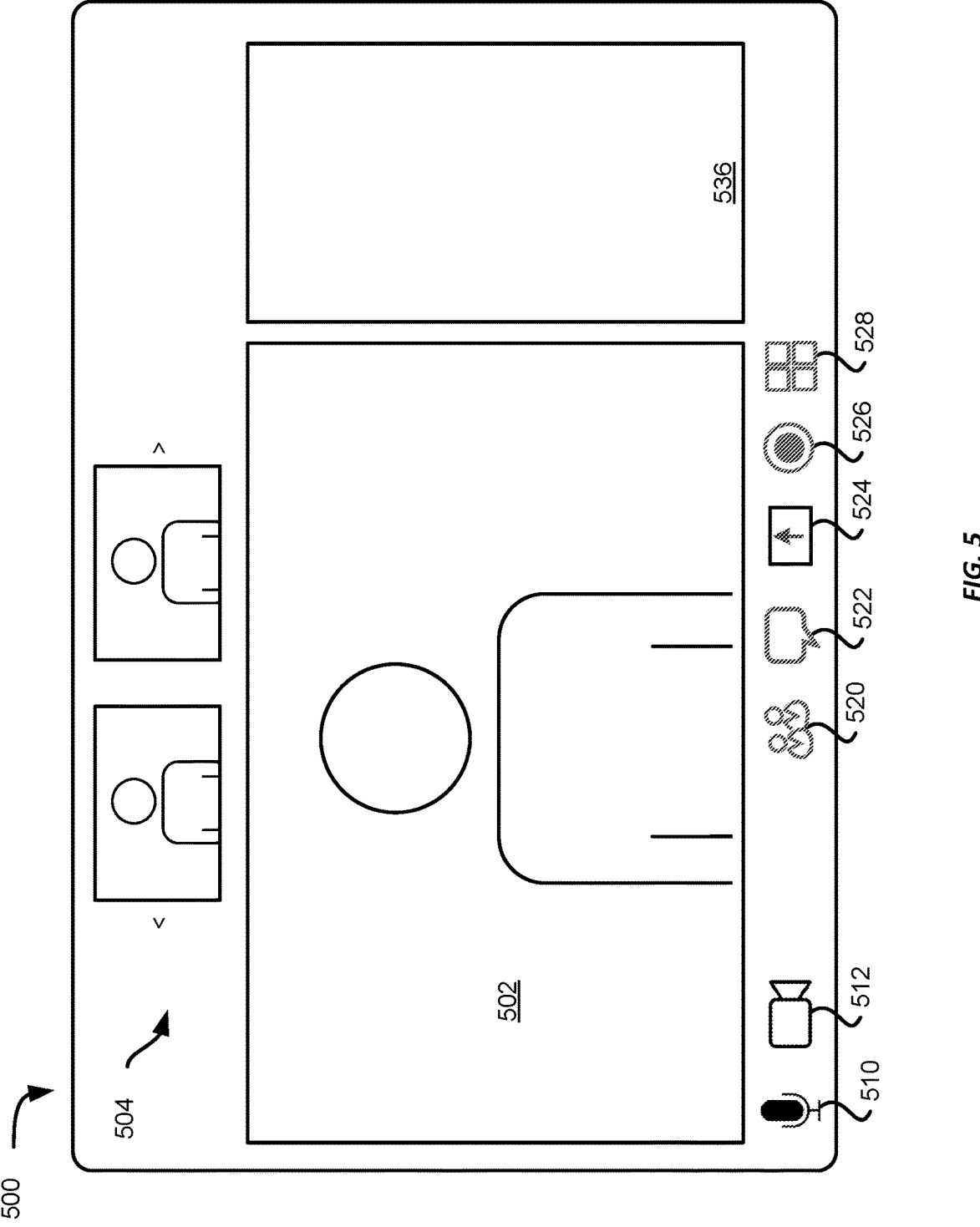
FIG. 5 shows an example graphical user interface ("GUI") for use with example systems and methods for AI-assisted transcript analysis and script generation.

Referring now to FIG. 5, FIG. 5 shows an example GUI 500 for use with example systems and methods for AI-assisted transcript analysis and script generation. The host client device 330 executes video conference software, which in turn displays the GUI 500 on the host client device's display. In this example, the GUI 500 includes a speaker view window 502 that presents the current speaker in the virtual conference. Above the speaker view window 502 are smaller participant windows 504, which allow the host to view other participants in the virtual conference, as well as controls ("<" and ">") to let the host scroll to view other participants.

Beneath the speaker view window 502 are a number of interactive elements 510-528 to allow the host to interact with the video conference software. Controls 510-512 may allow the host to toggle on or off audio or video streams captured by a microphone or camera connected to the host client device 326. Control 520 allows the participant to view any other participants in the meeting with the participant, while control 522 allows the user to send text messages to other participants, whether to specific participants or to the entire meeting. Control 524 allows the participant to share content from their client device. Control 526 allows the participant toggle recording of the meeting, and control 528 allows the user to select an option to join a breakout room.

Adjacent to the speaker view window 502 is a window 536 only visible to the host that includes the suggested follow-up topics for the virtual conference. As discussed above, the suggested follow-up topics may be provided in any suitable form, such as in the form of one or more suggested topics, an agenda for the meeting, or a script for the host to follow. In some examples, the suggested follow-up topics may include metadata generated by the feature analysis functionality 367, such as sentiment or level of engagement information. Thus, the host may be informed as to another participant's sentiment or level of engagement with a particular suggested follow-up topic. Thus, the host is able to access and the suggested follow-up topics during the meeting or before the meeting begins.

Referring now to FIG. 6, FIG. 6 shows an example method 600 for AI-assisted transcript analysis and script generation. The example method 600 will be described with respect to the system 300 shown in FIGS. 3A-3B; however, any suitable system may be employed according to different examples.

At block 610, the virtual conference provider 310 receives audio streams from a virtual conference hosted by the virtual conference provider 310. As discussed above, a virtual conference may be a videoconference, but it may be a telephone call, messages exchanged in a chat channel, or a combination of different communication channels. For purposes of this example, the virtual conference is a telephone call, but it should be appreciated that any type of virtual conference may be employed.

During the virtual conference, multiple participants will communicate with each other via the audio streams captured by their respective client devices, whether telephones, smartphones, tablet computers, laptop or desktop computers, or dedicated video conferencing equipment. For virtual conferences that employ chat messages, the participants may enter chat messages using a keyboard provided by their client device. All of the audio streams and chat messages ("content streams") may be received by the virtual conference provider 310 before being distributed out to other the participants in the virtual conference. Thus, the virtual conference provider 310 has access to the content of the content streams.

At block 620, the virtual conference provider 310 optionally receives one or more keywords 354. As discussed above, keywords 354 may be provided by a user, such as a host of a virtual conference or by a team or organization the host works with. In some examples, keywords 354 may be generated by the virtual conference provider 310 based on analysis of transcripts over time, such as keywords associated with topics that appear repeatedly over multiple virtual conferences. However, it should be appreciated that keywords 354 are not required for some example systems and methods of AI-assisted transcript analysis and script generation.

At block 630, the virtual conference provider 310 performs automated speech recognition using its speech recognition functionality 350 to generate a transcript 352 of the virtual conference, which may be stored in a data store 312. Content streams that arrive as text may be included in the transcript 352 or associated with the transcript 352 in a separate file or database record(s), though speech recognition of such content is not needed. As discussed above with respect to FIG. 3B, the transcript analysis functionality 360 may operate on one or more transcripts. And while this discussion is made with respect to one transcript, multiple transcripts may be analyzed concurrently using these techniques to generate a set of follow-up suggestions that have been informed by the relevant discussions from all suitable transcripts.

At block 640, the virtual conference provider 310 determines one or more utterances 410 within the transcript 352 of the virtual meeting. In this example, the virtual conference provider 310 accesses the data store to obtain keywords 354 and identifies portions of the transcript 352 that include the keywords 354, generally as described above with respect to FIG. 3B. It may also perform semantic or grammatical analysis to identify coherent portions of the transcript 352 to identify as utterances 410, such as phrases or complete sentences. Some examples may identify all sentences or complete thoughts in a transcript 352 as utterances 410 based on semantic or grammatical analysis without reference to keywords 354, though the use of keywords 354 may help reduce the number of utterances 410 identified during the virtual conference.

At block 650, the virtual conference provider 310 determines one or more sub-topics based on the identified utterances 410, as discussed above with respect to FIG. 3B. In this example, sub-topic analysis 364 extracts phrases associated with one or more keywords 354 within the utterances 410 to generate sub-topics 412. Further, sub-topic analysis may also generate a sub-topic 412 associated with multiple utterances 410, such in cases where two utterances 410 contain similar meanings. Further, a single utterance 410 may be used to generate multiple sub-topics 412. For example, a single sentence may express multiple different semantic ideas or may include multiple keywords 354, each of which may be used to generate a different sub-topic 412. The utterances and corresponding sub-topics are then related to each other, such as in a transcript feature graph 400.

At block 660, the virtual conference provider 310 determines one or more topics 414 based on the sub-topics 412, generally as discussed above with respect to FIG. 3B. In this example, topic analysis 362 identifies key-phrases by extracting n-grams from the sub-topics to generate topics 414. In some examples, each extracted n-gram may be a discrete topic 414, while in other cases, topic analysis 362 may generate a single topic based on multiple extracted n-grams, such as by employing a trained ML model or other n-gram extraction algorithm. Further, a single n-gram may contribute to the generation of multiple topics 414.

At block 670, the virtual conference provider 310 determines metainformation for each identified utterance 410, sub-topic 412, and topic 413, generally as described above with respect to FIG. 3B. In this example, feature analysis 367 analyzes the identified utterances to determine sentiment and levels of engagement for each. For each of these parameters, it may generate a relationship between the utterance and the subtopic, such as a weight or other strength value associated with the parameter and the utterance that may be propagated to the sub-topic. The determined metainformation, such as the sentiment and levels of engagement, may then be propagated to related sub-topics, weighted and combined as discussed above to generate corresponding metainformation for each of the sub-topics. Further, because an utterance may be related to multiple sub-topics, the metainformation may indicate the relationship between the utterance and each sub-topic. The metainformation for the sub-topics are then propagated to the corresponding topics. Thus, feature analysis 367 generates metainformation that is stored as metadata associated with each identified utterance, sub-topic, and topic. And while this example generates metadata corresponding to sentiment and level of engagement, other types of metainformation may be analyzed as well. The utterances, sub-topics, topics, and metadata may then be stored in the data store 312.

In addition to determining metainformation, the virtual conference provider 310 may also performing ranking or filtering, generally as discussed above with respect to the ranking and filtering functionality 368 discussed in FIG. 3B. As discussed above, the ranking and filtering may reduce the number of generated topics and may occur either before or after feature analysis 367 is performed. Though in some examples, ranking and filtering 368 may be omitted.

At block 680, the virtual conference provider 310 generates one or more follow-up suggestions 380 for a subsequent virtual conference based on the metadata. As discussed above, script generation 369 may generate information for the user for a subsequent virtual meeting with the participants. As discussed above, the script generation functionality 369 may employ a LLM to generate suggestions based on the identified topics, sub-topics, or utterances as well as associated metadata. The follow-up suggestions 380 may be provided in the form of one or more topics to discuss, information indicating the user's sentiment, level of engagement, or other feature associated with the topics, a proposed agenda, or an outline or complete script for the user to follow for a subsequent virtual conference. The follow-up suggestions 380 may be provided in a GUI presented to the user, sent in an email or chat message, sent via text messaging, or may be stored in the data store 310 for the user to later retrieve.

Figure 7:
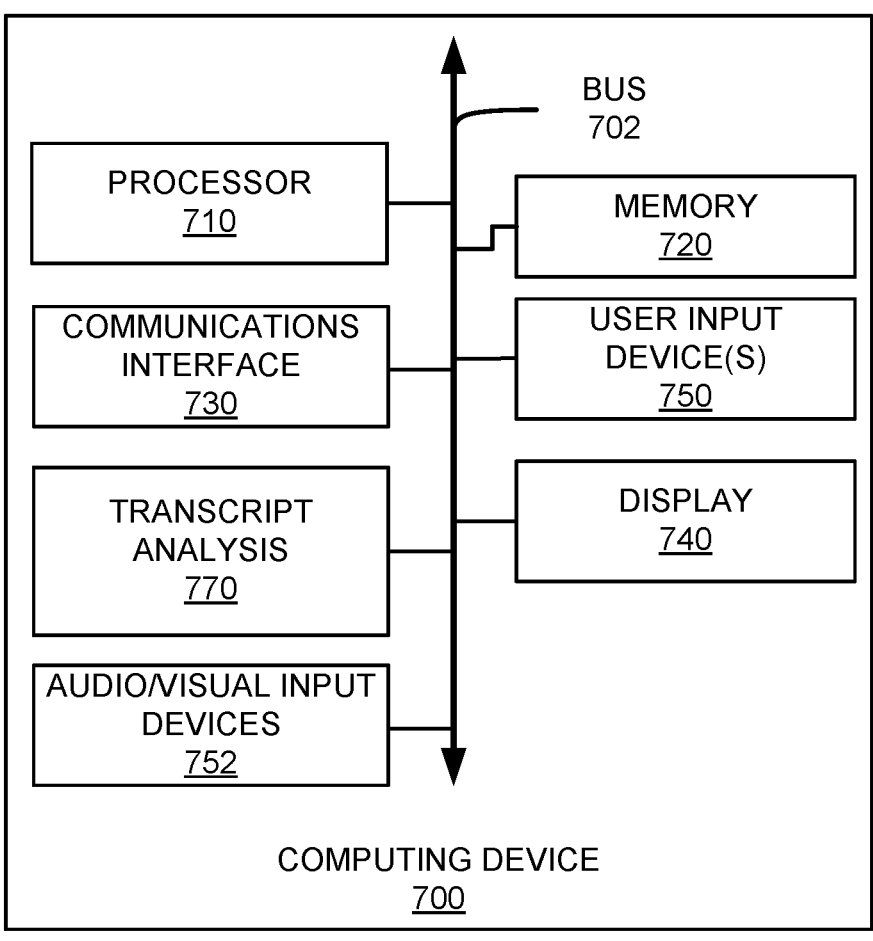
FIG. 7 shows an example computing device suitable for use with systems and methods for AI-assisted transcript analysis and script generation.

Referring now to FIG. 7, FIG. 7 shows an example computing device 700 suitable for use in example systems or methods for AI-assisted transcript analysis and script generation according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for AI-assisted transcript analysis and script generation according to different examples, such as part or all of the example methods described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes video conference software 760 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a virtual conference provider, audio streams from a plurality of participants during a virtual conference;
performing speech recognition, by the virtual conference provider, on the received audio streams to generate a transcript of the virtual conference;
determining, based on the transcript, one or more utterances made during the virtual conference;
determining, using a first trained machine learning ("ML") model, one or more sub-topics discussed during the virtual conference based on the one or more utterances;
determining, using a second trained machine learning ("ML") model, one or more topics discussed during the virtual conference based on the one or more sub-topics;
determining metadata corresponding to each of the one or more topics, the one or more sub-topics, and the one or more utterances; and
generating and providing suggested follow-up topics for a subsequent virtual conference based on the metadata.

2. The method of claim 1, further comprising determining first and second metadata corresponding to at least one utterance, the first metadata indicating a first relationship with a first sub-topic and the second metadata indicating a second relationship with a second sub-topic.

3. The method of claim 1, wherein the metadata comprises one or more of a sentiment or an engagement level of one or more of (i) the one or more utterances, (ii) the one or more sub-topics, or (iii) the one or more topics.

4. The method of claim 1, wherein the metadata comprises a speaker of a corresponding utterance of the one or more utterances.

5. The method of claim 1, wherein the metadata comprises a weight or a confidence score associated with a feature associated with an utterance of the one or more utterances.

6. The method of claim 1, wherein generating the suggested follow-up topics is based on a negative sentiment associated with one or more of (i) the one or more utterances, (ii) the one or more sub-topics, or (iii) the one or more topics.

7. The method of claim 1, wherein generating the suggested follow-up topics is based on a level of engagement associated with one or more of (i) the one or more utterances, (ii) the one or more sub-topics, or (iii) the one or more topics.

8. A system comprising:
a communications interface;
a non-transitory computer-readable medium; and
one or more processors configured to execute processor-executable instructions stored in the non-transitory computer-readable medium to:
receive audio streams from a plurality of participants during a virtual conference;
perform speech recognition on the received audio streams to generate a transcript of the virtual conference;

determine, based on the transcript, one or more utterances made during the virtual conference;

determine, using a first trained machine learning ("ML") model, one or more sub-topics discussed during the virtual conference based on the one or more utterances;

determine, using a second trained machine learning ("ML") model, one or more topics discussed during the virtual conference based on the one or more sub-topics;

determine metadata corresponding to each of the one or more topics, the one or more sub-topics, and the one or more utterances; and generate and providing suggested follow-up topics for a subsequent virtual conference based on the metadata.

9. The system of claim 8, wherein the one or more processors are configured to execute further processor-executable instructions stored in the non-transitory computer-readable medium to determine first and second metadata corresponding to at least one utterance, the first metadata indicating a first relationship with a first sub-topic and the second metadata indicating a second relationship with a second sub-topic.

10. The system of claim 8, wherein the metadata comprises one or more of a sentiment or an engagement level of one or more of (i) the one or more utterances, (ii) the one or more sub-topics, or (iii) the one or more topics.

11. The system of claim 8, wherein the metadata comprises a speaker of a corresponding utterance of the one or more utterances.

12. The system of claim 8, wherein the metadata comprises a weight or a confidence score associated with a feature associated with an utterance of the one or more utterances.

13. The system of claim 8, wherein generating the suggested follow-up topics is based on a negative sentiment associated with one or more of (i) the one or more utterances, (ii) the one or more sub-topics, or (iii) the one or more topics.

14. The system of claim 8, wherein generating the suggested follow-up topics is based on a level of engagement associated with one or more of (i) the one or more utterances, (ii) the one or more sub-topics, or (iii) the one or more topics.

15. A non-transitory computer-readable medium comprising processor-executable instructions configured to cause one or more processors to:

receive audio streams from a plurality of participants during a virtual conference;

perform speech recognition on the received audio streams to generate a transcript of the virtual conference;

determine, based on the transcript, one or more utterances made during the virtual conference;

determine, using a first trained machine learning ("ML") model, one or more sub-topics discussed during the virtual conference based on the one or more utterances;

determine, using a second trained machine learning ("ML") model, one or more topics discussed during the virtual conference based on the one or more sub-topics;

determine metadata corresponding to each of the one or more topics, the one or more sub-topics, and the one or more utterances; and generate and providing suggested follow-up topics for a subsequent virtual conference based on the metadata.

16. The non-transitory computer-readable medium of claim 15, wherein the metadata comprises one or more of a sentiment or an engagement level of one or more of (i) the one or more utterances, (ii) the one or more sub-topics, or (iii) the one or more topics.

17. The non-transitory computer-readable medium of claim 15, wherein the metadata comprises a speaker of a corresponding utterance of the one or more utterances.

18. The non-transitory computer-readable medium of claim 15, wherein the metadata comprises a weight or a confidence score associated with a feature associated with an utterance of the one or more utterances.

19. The non-transitory computer-readable medium of claim 15, wherein generating the suggested follow-up topics is based on a negative sentiment associated with one or more of (i) the one or more utterances, (ii) the one or more sub-topics, or (iii) the one or more topics.

20. The non-transitory computer-readable medium of claim 15, wherein generating the suggested follow-up topics is based on a level of engagement associated with one or more of (i) the one or more utterances, (ii) the one or more sub-topics, or (iii) the one or more topics.

* * * * *